Patented Oct. 1, 1946

2,408,619

UNITED STATES PATENT OFFICE 2,408,619

ARC WELDING ELECTRODES

Erwin Felix Friedlander, Hobart, Tasmania, Australia, assignor to O. & F. Company Proprietary Limited, Hobart, Tasmania, Australia, a corporation of Tasmania No Drawing. Application November 10, 1943, Serial No. 509,795. In Australia November 14, 1942

4 Claims. (Cl. 219—8)

This invention relates to arc welding electrodes, and more particularly to an improved electrode which will deposit high grade super hard alloys, such as high speed steel, suitable for any kind of hard surfacing or the building up and tipping of tools or the like.

It is known that a deposit of alloy steel suitable as a hard facing metal can be obtained by using special alloy core wire of substantially the same analysis as the required weld, or by using an electrode consisting of a mild steel casing or tube in which metallic elements and fluxes in powder form are packed.

In the first type of electrode having an alloy core wire, an alloy steel ingot of the desired analysis must first be produced and drawn into wire, and this wire must later be coated with flux to prevent loss of the alloying metals in the arc and to improve the arc characteristics. To obtain different grades of alloy deposits, a whole range of alloy core wires of different analysis is required which makes the manufacture of these electrodes complicated and costly. Moreover, such electrodes, because of the high resistance of the alloy core wire, can generally only be used with low current which is not always as the welder desires.

The second type of electrode consisting of a mild steel casing or tube in which metallic elements and fluxes in powder form are packed, is difficult to produce and limited in application. Furthermore, the procedure for the use of such tubes is complicated because the end of the rod often drops off in a lump if too high a current be used, and very often the weld must be puddled by forcing the end of the rod into the molten metal to produce a weld free from blowholes. Moreover, the starting current must always be kept high. For instance with a $\frac{3}{16}$" diameter tube rod a 200–225 amperage current is usually required in starting and then reduced to as low as 150 amperes during the welding period as the weld progresses and the part becomes hot.

Such welding technique can only be maintained by a very skilled and experienced welder and, apart from this, very often no protection of the molten metal against the oxygen and nitrogen of the air is possible. Any coating on the outside of the tube increases the production costs and at the same time increases the difficulties in application and produces a weld deposit covered with slag which has to be removed.

The present invention has for its object to overcome all of the above mentioned difficulties.

According to the invention, an electrode is produced by using standard mild or carbon steel core wire of less than .25% C and by incorporating all necessary alloying ingredients in the coating so that the electrode will deposit any desired hard facing weld alloy of super hardness of 60 or more Rockwell C. The mild or carbon steel core wire has a hardness of only 4–10 Rockwell C, hence it can be readily drawn into wire of any gauge or length. It also has better electrical conductivity than alloy steel core wire.

The invention also has the advantage that it enables the analysis of the deposited weld metal to be changed simply by varying the percentages or quantities of the alloying ingredients incorporated in the coating.

The invention further provides a combination of ingredients in the coating material which will stabilize the arc and shield it from the atmosphere.

The alloying ingredients usable in the coating are carbon, chromium, cobalt, molybdenum, manganese, silicon, tungsten and vanadium. It is not, however, necessary to use all of these but they may be selected as required according to the analysis of the weld metal desired. The proportions can also be varied according to requirements. Usually the coating should contain by weight 10–40% molybdenum, 10–20% chromium, 20–70% tungsten, 2–20% vanadium and 2–30% carbon.

The carbon used is graphite and the metals as such or as ferro-alloys. The other ingredients are compounds commonly used in electrode coatings such as for example asbestos, cellulose, dolomite, silicate of sodium or potassium and whiting (calcium carbonate).

The solid ingredients are used in a finely ground or pulverised form and all of the ingredients are thoroughly mixed as a plastic dry mass suitable for application to the core wire by extrusion under high pressure.

The external diameter of the coating may vary, but practical examples lie between 1.4 to twice the diameter of the core wire i. e. for a 4 mm. wire between 5.6 and 8 mm.

The extrusion process under high pressure is found to be most effective in securing the desired homogeneous and concentric coating and the necessary thickness with sufficient hardness and adhesion to remain attached to the core wire.

One suitable coating mixture given by way of example consists of:

| | Percent by weight |
|---|---|
| Tungsten metal | 35 |
| Ferro-molybdenum | 13.5 |
| Ferro-chromium | 13 |
| Ferro-vanadium | 6.5 |
| Graphite | 5.0 |
| Calcium carbonate | 5.0 |
| Cellulose | 2.0 |
| Sodium silicate sol. 40° Bé | 20.0 |

Using such coating with a diameter of 1.5 times the core wire diameter, the deposited metal contains from .75 to .85% carbon, from 18 to 20% tungsten, from 3.5 to 4% molybdenum, from 3.5 to 4% chromium and from 1.0 to 1.3% vanadium. The hardness is about 66 Rockwell C.

During the use of the electrode and under the heat of the arc, the alloying elements or metals incorporated in the coating combine with the metal of the core wire to produce the hard alloy deposit, and if necessary the slag is also produced from the coating to cover the weld. The coating serves also as a medium to balance the alloy content of the weld.

Because of the cast structure of the deposited weld metal with embedded metal carbides, the material is more suitable for some machine operations than rolled high speed steel or steel of super hardness and it retains its hardness even if heated to 600° C. or more.

The electrodes can be used with either direct or alternating current, will flow freely with negligible spatter and deposit a dense homogeneous weld. The coating with its high percentage of metals and graphite conducts the current and therefore facilitates striking of the arc. The penetration is sufficient to secure a firm bond with the parent metal and not so deep that dilution could take place.

The amount of slag is so small that thick deposits can be built up in carbon or copper moulds without interruption for slag removal. This prevents cracking of the deposited metal.

By the use of the improved electrode, the whole process of hard surfacing or building up and tipping of tools such as lathe and shaper tools, drills, dies, shear blades and the like can be simplified. It also renders possible the automatic welding of hard surfaces.

What I claim is:

1. An arc welding electrode, consisting of a mild steel core wire of relatively low hardness and a coating to be applied to the wire consisting of tungsten metal in substantially 35% by weight, molybdenum in substantially 13.5% by weight, ferro-chromium in substantially 13% by weight, ferro-vanadium in substantially 6.5% by weight, graphite in substantially 5% by weight, calcium carbonate in substantially 5% by weight, sodium silicate in substantially 20% by weight, and cellulose.

2. A composition as defined in claim 1, wherein the coating diameter is about 1.5 times the core diameter to provide in the deposited metal approximately 0.8% carbon, approximately 20% tungsten, approximately 4% molybdenum, approximately 4% chromium, and approximately 1.3% vanadium, with a hardness of approximately 66 Rockwell C scale.

3. An arc welding electrode consisting of a mild steel core wire of less than .25% C having an extruded heavy coating applied thereto and containing approximately 35% tungsten, approximately 10% molybdenum, approximately 2% vanadium, approximately 6% chromium and approximately 2% carbon which coating, during welding, combines with the metal of the core wire to produce a superhard alloy deposit containing approximately 18% tungsten, approximately 3.5% molybdenum, approximately 1% vanadium, approximately 3.5% chromium and approximately .75% carbon with 64–73.25% iron and having a hardness of 60–66 Rockwell C.

4. An arc welding electrode as claimed in claim 3 wherein the external diameter of the heavy coating is between 1.4 to twice the diameter of the core wire.

ERWIN FELIX FRIEDLANDER.